Dec. 16, 1930.  J. V. PUGH  1,785,424
BRAKE DRUM
Filed Nov. 22, 1926
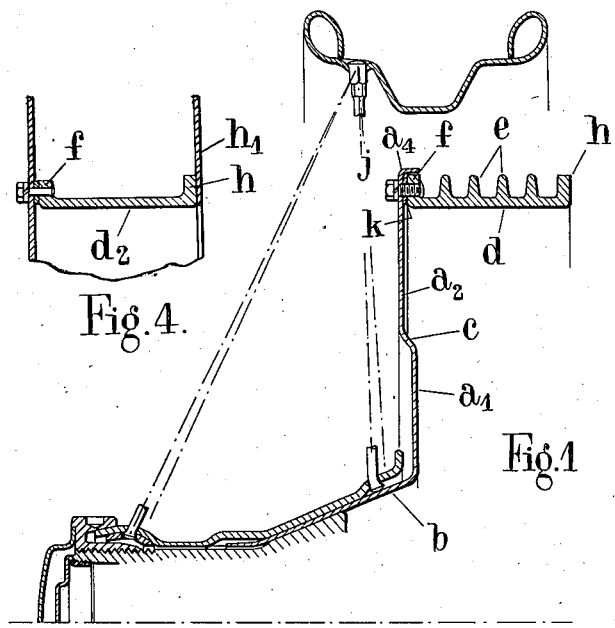
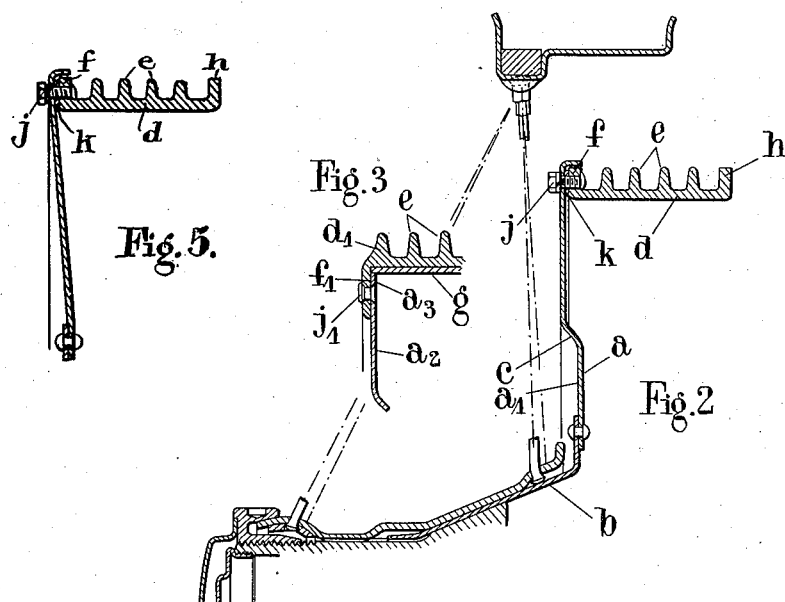

Patented Dec. 16, 1930

1,785,424

UNITED STATES PATENT OFFICE

JOHN VERNON PUGH, OF COVENTRY, ENGLAND, ASSIGNOR TO RUDGE-WHITWORTH, LIMITED, OF COVENTRY, ENGLAND

BRAKE DRUM

Application filed November 22, 1926, Serial No. 150,094, and in Great Britain December 1, 1925.

This invention relates to rotational devices including vehicle wheels and the parts associated therewith such as brake drums and the like.

It is generally desirable that the tires of vehicle wheels should not stand any farther away from the side of the vehicle than can be helped and for this reason the room taken up by a brake drum is frequently reduced by locating the drum within an enlargement of the wheel hub. This, however, greatly increases the cost of the hub and to some degree the same effect results from enlarging the outer hub part sufficiently to accommodate the bolt ends or flanges by which a brake drum is attached to the inner hub part of a detachable wheel.

The attachment of brake drums and the like by means of a hollow conical region pressed against a conical abutment has been proposed and for this purpose a thin diaphragm or like central part of the brake drum or other element is desirable. The formation of large diameter elements of sufficient rigidity from thin material alone, however, presents difficulties.

The object of the present invention is to overcome the foregoing difficulties and to provide improved forms of brake drums and like elements.

The invention consists in a brake drum or like rotational device having a central diaphragm constructed of thin material in combination with a circular or encircling part of more rigid construction which is fastened to the diaphragm by a series of attachment means distributed preferably equidistantly around the axis of rotation and which increases the stiffness of the structure.

The invention further consists in a rotational device in accordance with the preceding paragraph, in which the central thin diaphragm is provided with a hollow conical attachment region.

The invention further consists in a rotational device in accordance with either of the preceding paragraphs in which a hollow cylindrical encircling part constituting a brake drum is fastened at one edge to the attachment diaphragm and has connected to its other edge an annular ring of sufficient radial width to stiffen the structure.

The invention further consists in a device in accordance with any of the preceding paragraphs in which the diaphragm or annular ring extends radially beyond the encircling part to provide stiffening means in the nature of a flange or flanges.

The invention further consists in a device in accordance with any of the preceding paragraphs in which a hollow cylindrical encircling part of a brake drum is stiffened by means of one, two or a plurality of circular flanges or ribs projecting therefrom for use as attachment means or for dissipating heat.

The invention further consists in a device in accordance with any of the preceding paragraphs in combination with a wire spoke vehicle wheel having one row of spokes at each end of the hub which are both connected to that edge of the rim which is remote from the vehicle.

The invention also consists in improvements in or relating to rotational devices such as brake drums for vehicle wheels as hereinafter described.

Referring now to the accompanying drawings:—

Figure 1 shows a brake ring or drum in accordance with the invention;

Figure 2 shows a similar arrangement with some modifications;

Figure 3 is a fragmental view showing a brake ring of somewhat different construction.

Figure 4 is another fragmental view of a modified form of the brake ring.

Figure 5 shows another way of forming the central diaphragm or disc.

In carrying the invention into effect in one convenient form as illustrated by way of example in Figure 1 or 2, a wheel having wire spokes is provided with a built-up brake drum adapted to lie closely adjacent to the spokes on the inner side of the wheel and projecting towards the vehicle a distance corresponding to or not very greatly exceeding the free or unspoked portion of the tire rim.

The brake drum is built up from a central diaphragm $a$ formed of thin material, say of 1/20 of an inch or more in thickness. The diaphrgam is preferably formed with a central hollow conical region $b$ and the gripping of this region between the two hub parts and attachment and driving means may be of any suitable thin metal construction.

The flat part $a_1$ of the diaphragm $a$ may be disposed so as to just clear the inner edge of the outer hub part which may be as shown slightly flared to form a cavity and flanged or may be complementary to the cone upon which it is situated right up to the extreme edge and with depressions formed at the perforations for the spoke heads.

From the larger diameter end of a hollow conical region $b$ the diaphragm extends as a flat disc $a_1$ to about the middle of its width and is then set out or carried towards the wheel spokes by means of a frusto-conical region $c$ and then again takes the form of a flat disc $a_2$ or annular zone extending to the outer edge of the diaphragm. Alternatively the diaphragm may be formed as a very blunt cone as shown in Figure 5 extending from the end of the hollow conical gripping region up to the attachment to the cylindrical part of the brake drum.

The brake drum may be formed as a hollow cylindrical casting $d$ having stiffening or heat radiating ribs $e$ upon its outer surface and an out-turned flange $f$ provided at the edge of the brake ring remote from the vehicle for attachment to the diaphragm $a$ and the diaphragm may be provided with a turned-up edge $a_4$ in order to stiffen the structure. Alternatively the diaphragm may be extended from this edge as shown in Figure 4 towards the wheel rim by any desired amount for the same purpose.

The edge of the brake ring $d$ adjacent to the vehicle may also be provided with a stiffening flange $h_1$ and be attached thereto by the flange $h$ as shown in Figure 4 and with such a construction there may also be employed a plain cylindrical brake band $d^2$ such as may be formed from steel or the like with outwardly-turned flanges $f$ and $h$ at each end for attachment to the diaphragm and to a stiffening ring $h_1$.

Taking the rubbing surface of a suitable brake ring as being 400 mm. in diameter, the outside diameter, say of flanges, may be considerably larger, say up to 500 or 600 mm., and this construction may be adopted both in the diaphragm and in a stiffening ring at the inside edge of the brake ring. In some instances depending upon the type of brake gear employed, the internal diameter of an inside stiffening ring would be the same size as the rubbing surface of the brake ring but where possible the inside diameter of a stiffening ring could be made considerably smaller down to 300 mm. and in such cases the quantity of material used in the flange would be more valuable where it extends inwardly than where it extends outwardly.

As shown in Figure 3 a brake ring $d_1$ is formed with a flange $f_1$ inturned from its inner surface at the end remote from the vehicle for attachment to the outer edge $a_3$ of the diaphragm by means of rivets $j_1$, a cast cylindrical aluminium drum being lined with steel as at $g$ or other suitable material when desired.

A brake drum ring may be constructed as a comparatively shallow multi-ribbed band and can be made of steel rolled out after the manner adopted with heavy wheel tires or may be made of a strip bent around and welded, the strip being either of rectangular section and machined after rolling and welding or rolled to final section as in Figure 1 or Figure 4 and then welded, or a ring can be made of malleable casting or in some cases of ordinary cast iron, in which latter case encircling and tensioned wires or the like may be used as reinforcements in the grooves between ribs such as $e$.

Rims as hereinbefore described may be conveniently fastened to the diaphragm by means of a number of screws $j$ and between the diaphragm and the rim, washers $k$ either of asbestos or some other deadening material may be inserted to obviate vibration or noise. In some cases steel or other metal washers may be satisfactorily employed and will provide a gap between the rim and the diaphragm so as to get rid of any oil leaking on to these regions.

Brake drums as hereinbefore described may be employed with any ordinary wire spoke wheels having beaded edge, well base or other types of rims. They may also if desired be employed with wheels of any other suitable construction.

It is to be understood that the constructions hereinbefore described are given by way of example only and that modifications and additions may be introduced without in any way departing from the spirit of this invention.

I claim:

1. A vehicle wheel braking device having in combination a thin plate metal disc upset centrally from a flat plate to afford increased rigidity and a vehicle wheel brake ring of not less than double the thickness of the material of said disc fastened thereto by a series of attachment means distributed around the axis of rotation.

2. A device in accordance with claim 1, in which the central thin disc is provided with a central hollow conical attachment region.

3. A device in accordance with claim 1 in which the disc is provided with an outer annulus which is "set up by a step" and lies in a plane of rotation further from the vehicle than the plane of the inner edge of the central part of the disk, 4. A device in accordance with claim 1 in which a ring of the material of the thin disc part extends beyond the means for attaching said disc to the brake drum, said ring being unattached to any other part and acting solely as stiffening means.

5. A vehicle wheel brake drum comprising in combination a sheet metal disc, a centrally apertured hollow conical region projecting outwards therefrom, an outwardly set-up region occupying the outer part of said disc, an inwardly turned rim around the periphery of said set-up region, a flanged brake ring having an interior contact area and nested within said rim, and a series of attachment means fastening said ring to said disc.

6. A vehicle wheel brake drum comprising in combination a sheet metal disc, a centrally apertured hollow conical region projecting outwards therefrom, an outwardly set-up region occupying the outer part of said disc, a flanged brake ring with an interior contact area, and a series of attachment means fastening said ring to said disc some distance within the outer periphery thereof.

7. A vehicle wheel brake drum comprising in combination a sheet metal disc, a centrally apertured hollow conical region projecting outwards therefrom, an outwardly set-up region occupying the outer part of said disc, an externally flanged and ribbed brake ring, an interior surface provided within said ring for contact with friction means, and a series of attachment means fastening a flange of said brake ring to said disc.

8. A vehicle wheel brake drum comprising in combination a sheet metal disc, a centrally apertured hollow conical region projecting outwards therefrom, an outwardly set-up region occupying the outer part of said disc, an inwardly turned rim around the periphery of said set-up region, a brake ring flanged externally at each end with an interior surface for contact nested within said rim, and a series of attachment means fastening one flange of said ring to said disc.

9. A vehicle wheel brake drum comprising in combination a sheet metal disc, a centrally apertured outwardly projecting hollow conical member attached concentrically thereto, an outwardly set-up region occupying the outer part of said disc, a brake ring with external flanges at each end and having an interior surface for contact, and a series of attachment means fastening said ring to said disc.

10. A vehicle wheel brake drum comprising in combination a sheet metal disc, a centrally apertured hollow conical element attached thereto and projecting centrally outwards therefrom, an outwardly set-up region occupying the outer part of said disc, an inwardly turned rim around the periphery of said set-up region, a flanged brake ring with an interior rubbing surface nested within said rim, and a series of attachment means fastening said ring to said disc.

11. A vehicle wheel brake drum comprising in combination a sheet metal disc, a centrally apertured hollow conical region projecting outwards therefrom, a rolled section brake ring with an interior rubbing surface and a series of attachment means fastening said ring to said disc.

12. A vehicle wheel brake drum comprising in combination a sheet metal disc, a centrally apertured hollow conical region projecting therefrom, a flanged brake ring with an interior rubbing surface, a series of attachment means fastening said ring to said disc, and washers formed of deadening material inserted between said disc and ring at each of said attachment means.

In testimony whereof I have signed my name to this specification.

JOHN VERNON PUGH.